(12) United States Patent  
Lan et al.

(10) Patent No.: US 12,124,000 B2  
(45) Date of Patent: Oct. 22, 2024

(54) IN-SITU SHEAR TEST DEVICE FOR HOLES IN ROCK-SOIL MASS

(71) Applicants: Chang'an University, Xi'an (CN); Institute of Geographic Sciences and Natural Resources Research, CAS, Beijing (CN)

(72) Inventors: Hengxing Lan, Xi'an (CN); Mervyn Lan, Xi'an (CN); Weifeng Sun, Xi'an (CN); Qinyuan Liang, Xi'an (CN); Langping Li, Xi'an (CN); Yuming Wu, Xi'an (CN); Changgen Yan, Xi'an (CN)

(73) Assignees: Chang'an University (CN); Institute of Geographic Sciences and Natural Resources Research, CAS (CN)

( * ) Notice: Subject to any disclaimer, the term of this patent is extended or adjusted under 35 U.S.C. 154(b) by 0 days.

(21) Appl. No.: 18/536,288

(22) Filed: Dec. 12, 2023

(65) Prior Publication Data

US 2024/0255675 A1   Aug. 1, 2024

Related U.S. Application Data

(63) Continuation of application No. PCT/CN2023/121914, filed on Sep. 27, 2023.

(30) Foreign Application Priority Data

Jan. 29, 2023   (CN) .......................... 202310071046.1

(51) Int. Cl.
*G01V 99/00* (2024.01)
*E21B 4/04* (2006.01)
*E21B 10/32* (2006.01)

(52) U.S. Cl.
CPC ................ *G01V 99/00* (2013.01); *E21B 4/04* (2013.01); *E21B 10/32* (2013.01)

(58) Field of Classification Search
CPC   G01V 99/00; E21B 4/04; E21B 10/32; E21B 41/0085; E21B 4/18; E21B 10/322;
(Continued)

(56) References Cited

U.S. PATENT DOCUMENTS 5,576,485 A   11/1996   Serata

FOREIGN PATENT DOCUMENTS

| CN | 103115829 A | 5/2013 |
| CN | 109187226 A | 1/2019 |

(Continued)

*Primary Examiner* — Eman A Alkafawi  
*Assistant Examiner* — Dilara Sultana

(57) ABSTRACT

An in-situ shear test device for holes in rock-soil mass include an axial loading system, a cutting power system, a rotation system, an upper cutterhead control system, a shear test system, and a lower cutterhead control system, which belongs to the field of geotechnical engineering and geological engineering technology. The device can accurately obtain the in-situ shear strength parameters in the hole of rock and soil, improve the engineering design level, and ensure the safety and stability of the project. The device adopts an in-situ shear test device in the hole of rock and soil mass with the above structure, which can solve the problems of difficulty in in-situ shear test for the holes in deep rock-soil mass, lack of test device, difficulty in radial test, difficulty in loading while shearing, and difficulty in multi-point in-situ test.

10 Claims, 6 Drawing Sheets

(58) Field of Classification Search
CPC . E21B 7/068; E21B 44/00; E21B 7/04; E21B 10/327; E21B 47/09; E21B 21/08
See application file for complete search history.

(56) References Cited

FOREIGN PATENT DOCUMENTS

| | | | | |
|---|---|---|---|---|
| CN | 107843481 B | * | 8/2019 | ............... G01N 3/02 |
| CN | 110186780 A | | 8/2019 | |
| CN | 113607573 A | | 11/2021 | |
| CN | 115184171 A | * | 10/2022 | ............... G01V 9/00 |
| CN | 116008099 A | | 4/2023 | |
| JP | 2007284896 A | | 11/2007 | |
| JP | 2015021767 A | | 2/2015 | |

* cited by examiner

IN-SITU SHEAR TEST DEVICE FOR HOLES IN ROCK-SOIL MASS

CROSS REFERENCE TO THE RELATED APPLICATIONS

This application is the Continuation Application of International Application No. PCT/CN2023/121914, filed on Sep. 27, 2023, which is based upon and claims priority to Chinese Patent Application No. 202310071046.1, filed on Jan. 29, 2023, the entire contents of which are incorporated herein by reference.

TECHNICAL FIELD

The invention relates to the field of rock-soil mass engineering and geological engineering technology, in particular to an in-situ shear test device for holes in rock-soil mass.

BACKGROUND ART

The shear strength of rock-soil mass is a very important index in the evaluation of slope stability, foundation strength, and stability. In order to obtain the shear strength of rock-soil mass in engineering practice, it is usually necessary to collect rock-soil mass samples in the field and carry out indoor direct shear tests to obtain the shear strength of rock-soil mass in the study area. However, due to the stress release during the sample collection process, the rock-soil mass is disturbed so there is a certain error between the shear strength parameters obtained from the laboratory test and the shear strength parameters of the in-situ actual rock-soil mass. Secondly, it is difficult to obtain the in-situ shear strength parameters of holes in rock-soil mass, and the research and development of the device are still blank. Therefore, it is of great theoretical value and practical significance to develop an in-situ test device for holes in rock-soil mass to accurately obtain the in-situ shear strength parameters of the holes in rock-soil mass, which is of great theoretical value and practical significance to reveal the mechanism of rock-soil mass engineering disasters, improve the engineering design level, and ensure the safety and stability of engineering.

SUMMARY

The purpose of the invention is to provide an in-situ test device for holes in rock-soil mass to solve the problems of difficulty in in-situ shear test for the holes in deep rock-soil mass, lack of test device, difficulty in radial test, difficulty in loading while shearing, and difficulty in multi-point in-situ test.

In order to achieve the above purpose, the invention provides an in-situ shear test device for holes in rock-soil mass, including an axial loading system, a cutting power system, a rotation system, an upper cutterhead control system, a shear test system, and a lower cutterhead control system;

the axial loading system includes a lower pressure cylinder, a cover plate is arranged above the lower pressure cylinder, and a reaction plate is arranged below the lower pressure cylinder;

the cutting power system includes a main cutting motor, the main cutting motor is connected to a lower bottom plate through a bolt;

the rotating system includes a first shaft reducer, the first shaft reducer is connected to a drill pipe through a coupling, a lower part of the drill pipe is provided with a second shaft reducer, and an outer part of the second shaft reducer is provided with a first lifting nut;

the upper cutterhead control system includes a first solenoid valve controller, the first solenoid valve controller is connected to a first lower protective cover through the bolt, and an upper surface of the first lower protective cover is provided with a first drive motor, outer parts of the first solenoid valve controller and the first drive motor is covered by a first upper protective cover;

the shear test system includes an upper cutting tool and a lower cutting tool, the upper cutting tool is connected to the upper cutterhead through a blade shaft, and the lower cutting tool is connected to the lower cutterhead through the blade shaft, a pressure block is arranged between the upper cutterhead and the lower cutterhead, and a scissor-type telescopic structure is arranged inside the pressure block, the scissor-type telescopic structure is connected to the pressure block through a shaft;

the lower cutterhead control system includes a second solenoid valve controller, an upper surface of the second solenoid valve controller is provided with the bolts, a side of the second solenoid valve controller is provided with a fixed bracket, the second solenoid valve controller is connected to a second upper protective cover through the bolt and fixed bracket, the second upper protective cover is provided with a second drive motor, and a second lower protective cover for protection is provided below the second upper protective cover;

pressure sensors are arranged on the upper cutting tool, the lower cutting tool, and the pressure block.

Preferably, a positioning flange is arranged on an upper surface of the cover plate, a limit column with limit and unloading rebound effect is arranged between the cover plate and the reaction plate, and a position limit screw and a spring are arranged inside the limit column; an outer part of the lower pressure cylinder is provided with a connecting plate, and the lower pressure cylinder is connected to the cover plate through the connecting plate.

Preferably, the main cutting motor is surrounded by support rods, and two ends of the support rod are connected to the reaction plate and a lower bottom plate respectively.

Preferably, the first shaft reducer and the coupling are covered by a circuit slip ring, and a bottom end of the drill pipe is provided with a bearing.

Preferably, a center of the first upper protective cover is provided with a first upper protective cover reserved hole, and a center of the first lower protective cover is provided with a first lower protective cover reserved hole.

Preferably, a center of the upper cutterhead is provided with an upper reserved hole, and an outer part of the upper reserved hole is provided with a cutting gear, an outer part of the cutting gear is provided with a tool gear, and the cutting gear is connected to the upper cutting tool through the tool gear, a center of the lower cutterhead is set with a lower reserved hole, an outer surface of the lower reserved hole is set with the cutting gear, the outer surface of the cutting gear is set with a tool gear, and the cutting gear is connected to the lower cutting tool through the tool gear.

Preferably, the top and bottom of the scissor-type telescopic structure are provided with a second lifting nut, and the second lifting nut is connected to a first lifting nut.

Preferably, a center of the second upper protective cover is provided with a second upper protective cover reserved hole, and a center of the second lower protective cover is provided with a second lower protective cover reserved hole.

Preferably, the drill pipe passes through the first upper protective cover reserved hole, the first lower protective cover reserved hole, the upper reserved hole, the lower reserved hole, and the second upper protective cover reserved hole, and is connected to the second lower protective cover reserved hole through the bearing.

Preferably, two ends of the second shaft reducer are connected to the upper reserved hole and the lower reserved hole respectively through the first lifting nut and the second lifting nut.

The advantages and positive effects of the in-situ test device for holes in rock-soil mass described in the invention are as follows:

The device described in the invention is convenient to carry out in-situ shear test research in the hole of deep rock-soil mass.

The invention can realize the loading test of different radial pressure constant values along the radial direction of the borehole wall.

The invention can realize the loading test of different shear rates and different shear pressure values of deep rock-soil mass.

Compared with the indoor test, the device described in the invention can realize the in-situ test process of loading and shearing inside the hole of the rock-soil mass, and can truly reflect the shear strength parameters of the actual rock-soil mass, and the in-situ shear test in the hole has small disturbance and strong representativeness, which is more in line with the actual situation of the project.

The invention can realize a multi-point in-situ test of different drilling depths for holes in the rock-soil mass.

The operation of the invention is simple and convenient and the test results perform well.

The device described in the invention can be disassembled, transported conveniently, and can be reused.

The following is a further detailed description of the technical solution of the invention through drawings and an embodiment.

Figure 1:
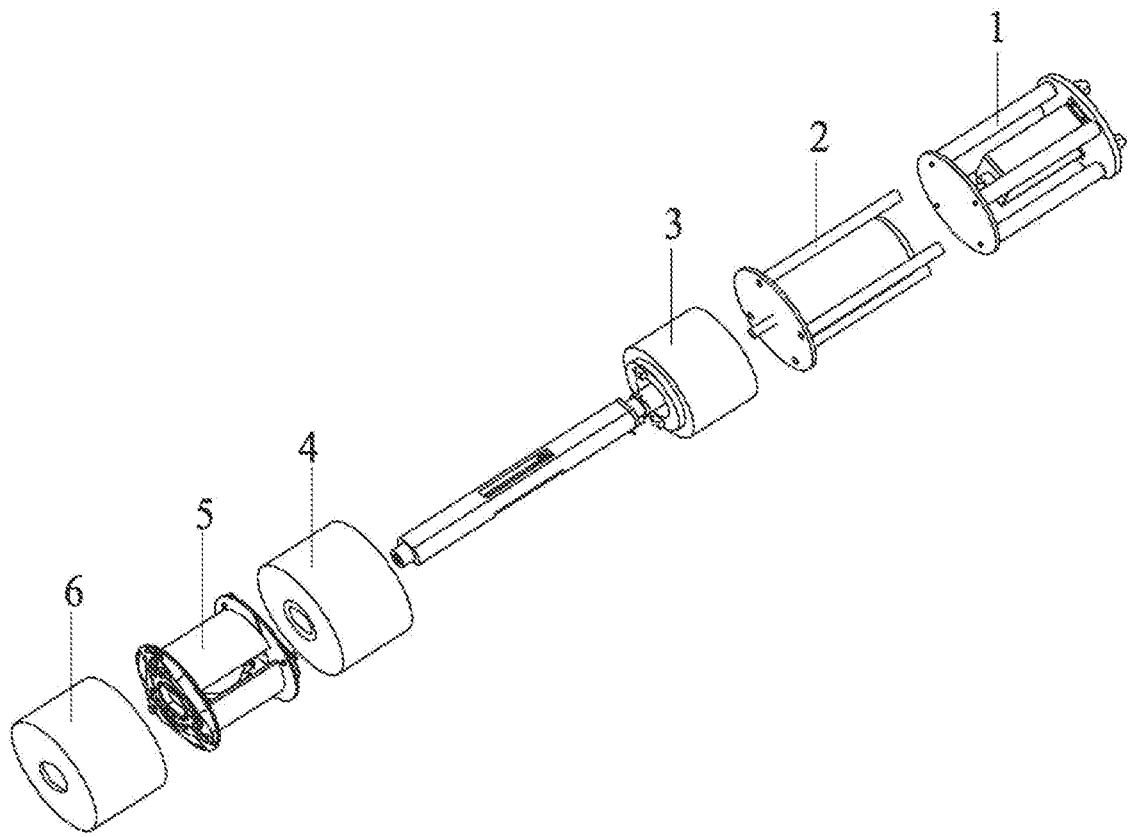
FIG. 1 is a schematic diagram of the overall structure of the invention.

MARKS IN THE FIGS 1, axial loading system; 1-1, positioning flange; 1-2, cover plate; 1-3, connecting plate; 1-4, limit column; 1-4-1, position limit screw; 1-4-2, spring; 1-5, lower pressure cylinder; 1-6, reaction plate; 2, cutting system; 2-1, support rod; 2-2, the main cutting motor; 2-3, the bottom plate; 3, rotation system; 3-1, the first shaft reducer; 3-2, circuit slip ring; 3-3, coupling; 3-4, drill pipe; 3-5, the second shaft reducer; 3-6, the first lifting nut; 3-7, bearing; 4, upper cutterhead control system; 4-1, the first upper protective cover reserved hole; 4-2, the first protective cover; 4-3, the first solenoid valve controller; 4-4, the first lower protective cover reserved hole; 4-5, the first drive motor; 4-6, the first lower protective cover; 5, shear test system; 5-1, upper cutterhead; 5-2, upper cutting tool; 5-3, reserved hole; 5-4, scissor-type telescopic structure; 5-5, pressure block; 5-6, shaft; 5-7, the second lifting nut; 5-8, lower reserved hole; 5-9, blade shaft; 5-10, cutting gear; 5-11, tool gear; 5-12, solenoid valve control switch; 5-13, lower cutterhead; 5-14, lower cutting tool; 6, lower cutterhead control system; 6-1, the second upper protective cover reserved hole; 6-2, the second upper protective cover; 6-3, the second drive motor; 6-4, the second solenoid valve controller; 6-5, the second lower protective cover; 6-6, fixed bracket; 6-7, the second lower protective cover reserved hole; 7, drilling hole; 8, hole wall soil; 9, upper ring groove; 10, shear surface; 11, lower ring groove.

DETAILED DESCRIPTION OF THE EMBODIMENTS

The following is a further explanation of the technical solution of the invention through drawings and embodiments.

Unless otherwise defined, the technical terms or scientific terms used in the invention should be understood by people with general skills in the field to which the invention belongs. The words 'first', 'second', and the like used in this invention do not represent any order, quantity, or importance, but are only used to distinguish different components, similar words such as 'include or 'comprise' mean that the elements or objects appearing before the word cover the elements or objects listed after the word and their equivalents, without excluding other elements or objects. Similar terms such as 'connected' or 'linked' are not limited to physical or mechanical connections, but can include electrical connections, whether direct or indirect. 'Up', 'down', 'left', 'right', etc. are only used to represent the relative positional relationship, when the absolute position of the described object changes, the relative positional relationship may also change accordingly.

Embodiment

Figure 2:
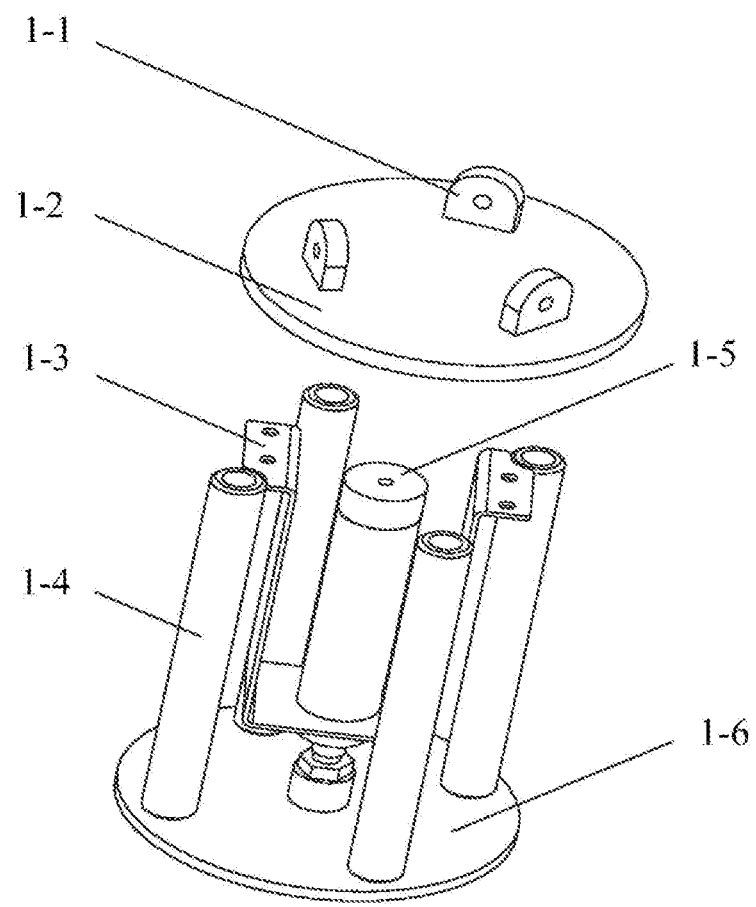
FIG. 2 is a schematic diagram of the structure of the axial loading system in the invention.
Figure 3:
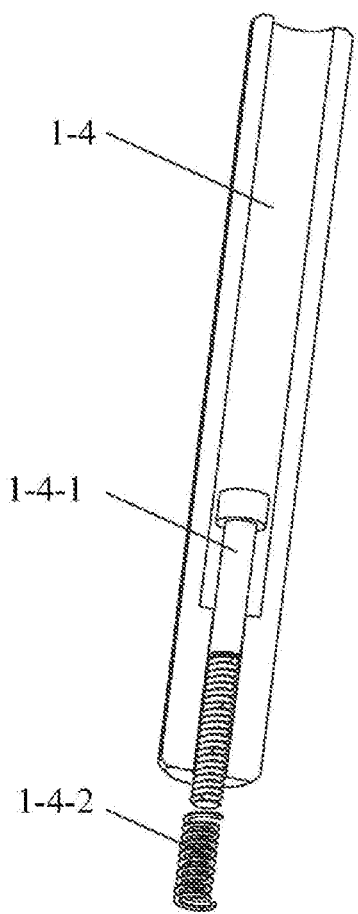
FIG. 3 is a schematic diagram of the longitudinal section structure of the limit column in the invention.

As shown in FIG. 1, the in-situ shear test device for holes in rock-soil mass, including the axial loading system 1, the cutting power system 2, the rotation system 3, the upper cutterhead control system 4, the shear test system 5 and the lower cutterhead control system 6;

As shown in FIG. 2 and FIG. 3, the axial loading system 1 includes the lower pressure cylinder 1-5, the cover plate 1-2 is arranged above the lower pressure cylinder 1-5, and the reaction plate 1-6 is arranged below the lower pressure cylinder 1-5;

The positioning flange 1-1 is arranged on the upper surface of the cover plate 1-2, the limit column 1-4 with limit and unloading rebound effect is arranged between the cover plate 1-2 and the reaction plate 1-6, and the position limit screw 1-4-1 and the spring 1-4-2 are arranged inside the limit column 1-4; the outer part of the lower pressure cylinder 1-5 is provided with the connecting plate 1-3, and the outer shell of the lower pressure cylinder 1-5 is connected to the cover plate 1-2 through the connecting plate 1-3, the pull rod end of the lower pressure cylinder 1-5 is connected with the reaction plate 1-6 through bolts. When the lower pressure cylinder 1-5 works, the lower pressure cylinder 1-5 provides thrust for the reaction plate 1-6, and the limit screw 1-4-1 and the spring 1-4-2 play the role of limit and rebound, high strength steel plate is selected for the cover plate 1-2 and the reaction plate 1-6.

Figure 4:
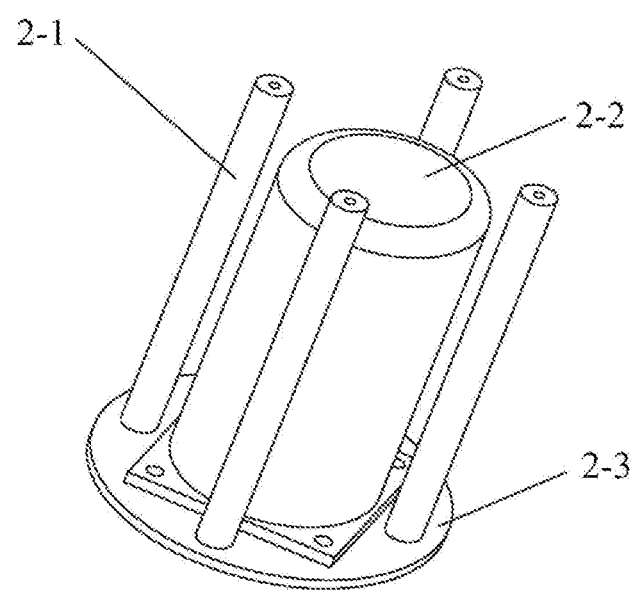
FIG. 4 is a schematic diagram of the structure of the cutting power system in the invention.

As shown in FIG. 4, the cutting power system 2 includes the main cutting motor 2-2, the main cutting motor 2-2 is connected to the lower bottom plate 2-3 through the bolt; the main cutting motor 2-2 is surrounded by support rods 2-1, and the two ends of the support rod 2-1 are respectively connected to the reaction plate 1-6 and the bottom plate 2-3.

Figure 5:
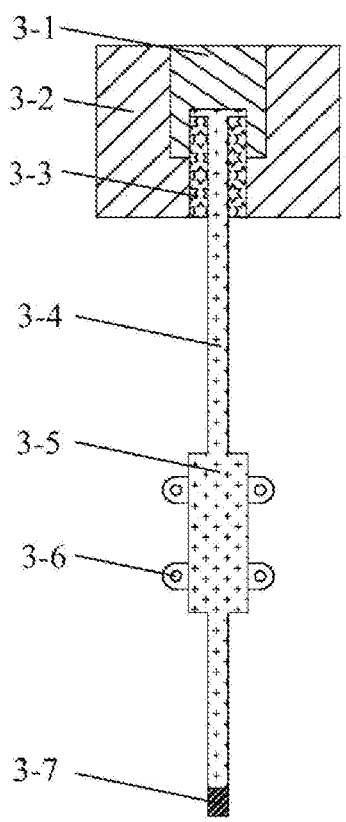
FIG. 5 is a schematic diagram of the rotating system structure in the invention.

As shown in FIG. 5, the rotating system 3 includes the first shaft reducer 3-1, the first shaft reducer 3-1 is connected to the drill pipe 3-4 through the coupling 3-3, the lower part of the drill pipe 3-4 is provided with the second shaft reducer 3-5, and the outer part of the second shaft reducer 3-5 is provided with the first lifting nut 3-6, the outer sleeve of the first shaft reducer 3-1 and the coupling 3-3 is equipped with the traveling slip ring 3-2, and the bottom end of the drill pipe 3-4 is equipped with the bearing 3-7.

Figure 6:
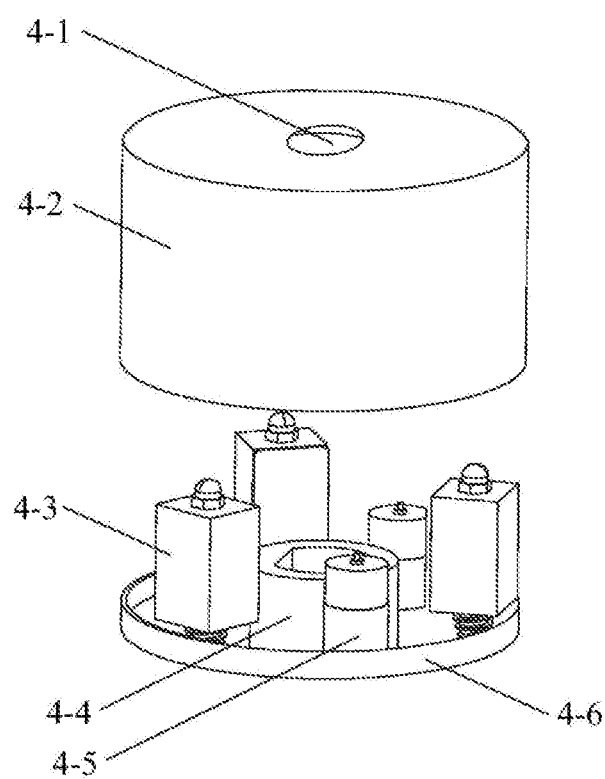
FIG. 6 is a schematic diagram of the structure of the upper cutterhead control system in the invention.

As shown in FIG. 6, the upper cutterhead control system 4 includes the first solenoid valve controller 4-3, the first solenoid valve controller 4-3 is connected to the first lower protective cover 4-6 through the bolt, and the upper surface of the first lower protective cover 4-6 is provided with the first drive motor 4-5, the outer parts of the first solenoid valve controller and the first drive motor are covered by the first upper protective cover 4-2, the first upper protective cover 4-2 and the first lower protective cover 4-6 are used to protect the device and avoid damage.

The center of the first upper protective cover 4-2 is set with the first upper protective cover reserved hole 4-1, and the center of the first lower protective cover 4-6 is set with the first lower protective cover reserved hole 4-4.

Figure 7:
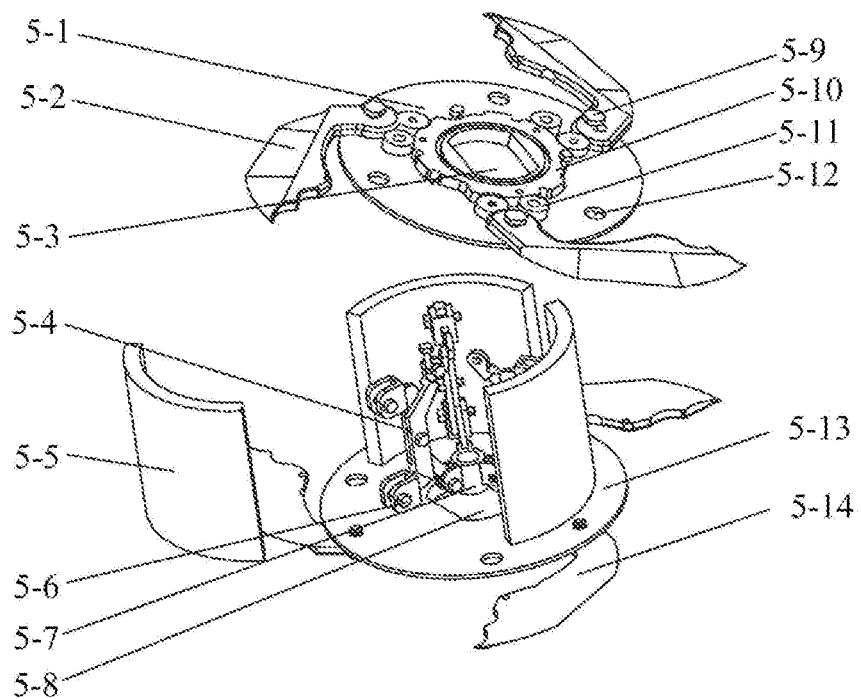
FIG. 7 is a schematic diagram of the structure of the shear test system in the invention.

As shown in FIG. 7, the shear test system 5 includes the upper cutting tool 5-2 and the lower cutting tool 5-14, the upper cutting tool 5-2 is connected to the upper cutterhead 5-1 through the blade shaft 5-9, and the lower cutting tool 5-14 is connected to the lower cutterhead 5-13 through the blade shaft 5-9, the center of the upper cutterhead 5-1 is set with the upper reserved hole 5-3, the outer part of the upper reserved hole 5-3 is set with the cutting gear 5-10, and the outer part of the cutting gear 5-10 is set with the tool gear 5-11, the cutting gear 5-10 is connected to the upper cutting tool 5-2 through the tool gear 5-11. The center of the lower cutterhead 5-13 is set with the lower reserved hole 5-8, the outer surface of the lower reserved hole 5-8 is set with the cutting gear 5-10, the outer surface of the cutting gear 5-10 is set with the tool gear 5-11, and the cutting gear 5-10 is connected with the lower cutting tool 5-14 through the tool gear 5-11, the upper cutterhead 5-1 and the lower cutterhead 5-13 are also equipped with the solenoid valve limit switch 5-12.

The pressure block 5-5 is arranged between the upper cutterhead 5-1 and the lower cutterhead 5-13, and the scissor-type telescopic structure 5-4 is arranged inside the pressure block 5-5, the scissor-type telescopic structure 5-4 is connected to the pressure block 5-5 through the shaft 5-6, the scissor-type telescopic structure 5-4 is selected from the existing structures according to the demand.

The pressure sensors are arranged on the upper cutting tool 5-2, the lower cutting tool 5-14, and the pressure block 5-5, which can collect the shear pressure and the radial pressure of the shear measurement respectively, and the shear process can be transmitted to the ground in real-time, and the real-time curve of shear pressure and shear displacement can be automatically displayed and saved, preferably, the upper cutting tool 5-2, the lower cutting tool 5-14 and the pressure block 5-5 are high-strength steel plates. The top and bottom of the scissor-type telescopic structure 5-4 are equipped with the second lifting nut 5-7, and the second lifting nut 5-7 is connected to the first lifting nut 3-6.

Figure 8:
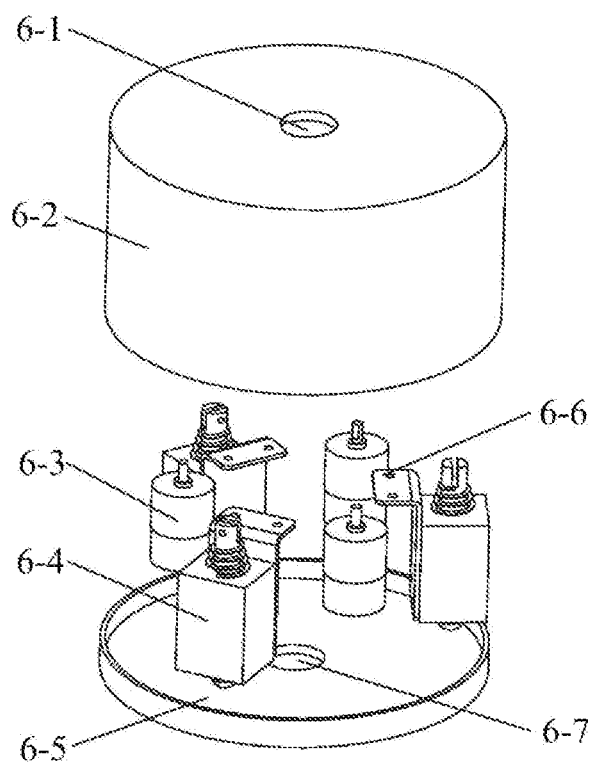
FIG. 8 is a structure diagram of the lower cutterhead control system of the invention.

As shown in FIG. 8, the lower cutterhead control system 6 includes the second solenoid valve controller 6-4, the upper surface of the second solenoid valve controller 6-4 is provided with the bolts, the side of the second solenoid valve controller 6-4 is provided with the fixed bracket 6-6, the second solenoid valve controller 6-4 is connected to the second upper protective cover 6-2 through the bolt and the fixed bracket 6-6, the second upper protective cover 6-2 is provided with the second drive motor 6-3, and the second lower protective cover 6-2 for protection is provided below the second upper protective cover 6-5; the second upper protective cover 6-2 and the second lower protective cover 6-5 are used to protect the device and avoid damage.

The center of the second upper protective cover 6-2 is set with the second upper protective cover reserved hole 6-1, and the center of the second lower protective cover 6-5 is set with the second lower protective cover reserved hole 6-7.

The first driving motor 4-5 is used to open the upper cutting tool 5-2 when cutting, and the first solenoid valve controller 4-3 is used to retract the upper cutting tool 5-2 to the original position; the second drive motor 6-3 is used to open the lower cutting tool 5-14 during cutting, and the second solenoid valve controller 6-4 is used to retract the lower cutting tool 5-14 to its original position.

As shown in FIGS. 5-8, the first shaft reducer 3-1, the circuit slip ring 3-2, and the coupling 3-3 drive the drill pipe 3-4 to rotate. The drill pipe 3-4 passes through the first upper protective cover reserved hole 4-1 and the first lower protective cover reserved hole 4-4 of the upper cutterhead control system 4; the second shaft reducer 3-5 is connected to the upper reserved hole 5-3 and the lower reserved hole 5-8 through the first lifting nut 3-6 and the second lifting nut 5-7; then the drill pipe 3-4 passes through the second upper protective cover reserved hole 6-1 of the lower cutterhead control system 6, and is connected to the second lower protective cover reserved hole 6-7 through the bearing 3-7.

When the cutting task is required, the first drive motor 4-5 and the second drive motor 6-3 open the upper cutting tool 5-2 and the lower cutting tool 5-14 respectively; at this time, the main cutting motor 2-2 works, and the drill pipe 3-4 drives the second shaft reducer 3-5 to rotate, thus the cutting gear 5-10 and the tool gear 5-11 are driven to rotate, and then the upper cutting tool 5-2 and the lower cutting tool 5-14 are driven to complete the cutting task. The second shaft reducer 3-5 rotates, and the pressure block 5-5 on the scissor expansion structure 5-4 is pushed by the first lifting nut 3-6 and the second lifting nut 5-7 to provide radial pressure. When the cutting task is completed, the main cutting motor 2-2 stops working, and the shear test system also stops working immediately. The first drive motor 4-5 and the second drive motor 6-3 retract the upper cutting tool 5-2 and the lower cutting tool 5-14, the first solenoid valve controller 4-3 and the second solenoid valve controller 6-4 restore the upper cutting tool 5-2 and the lower cutting tool 5-14 to the original position by controlling the solenoid valve limit switch 5-12.

Figure 9:
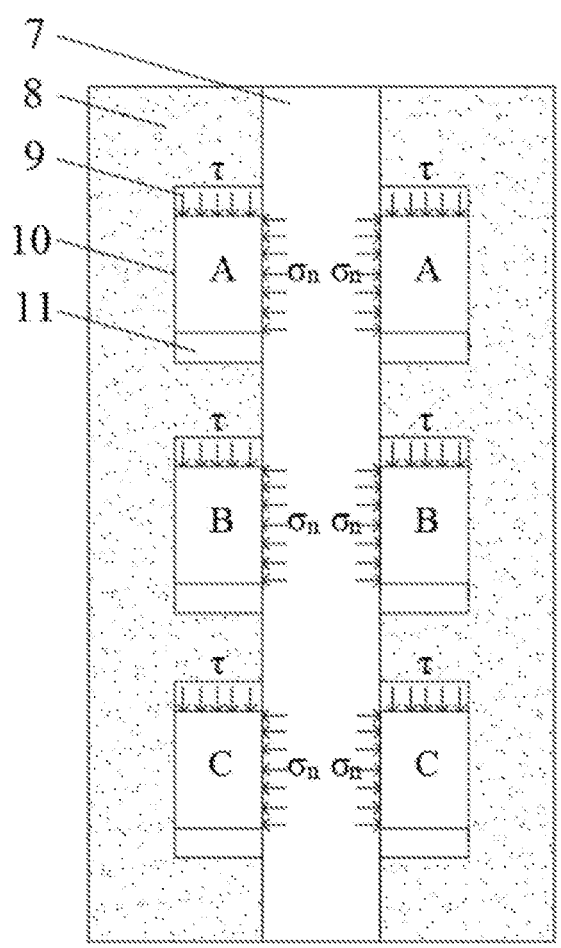
FIG. 9 is a schematic section diagram of the application of the invention in the borehole.

In order to carry out the in-situ shear test research in single-point or multi-point holes in rock-soil mass, the following operations need to be carried out:

a. The relevant components are installed as shown in FIG. 1; the drilling bit is used to form a hole in the middle of the rock-soil mass to form a geological model containing a borehole (circular cross-section) as shown in FIG. 9.

b. The positioning flange 1-1 in the axial loading system 1 is fixed by the steel wire rope, and the whole set of equipment is suspended by the steel wire rope to the predetermined depth point A in the borehole 7, as shown in FIG. 9.

c. The upper ring groove 9, and the lower ring groove 11 are opened: as shown in FIG. 7, the upper tool drive motor 4-5 opens the upper cutting tool 5-2, the lower tool drive motor 6-3 opens the lower cutting tool 5-14; the main cutting motor 2-2 works, the second shaft reducer 3-5 is driven to rotate, and the upper and lower cutting tools cut the soil to form the upper and lower ring grooves, as shown in FIG. 9.

d. After the upper and lower ring grooves are formed, the second solenoid valve controller 6-4 retracts the lower cutting tool 5-14 to restore it to its original position.

e. The shear radial pressure on is applied: As shown in FIG. 7 and FIG. 9, the pressure block 5-5 deeply loads the radial pressure on to the geological model A to a constant value, the radial pressure value can be controlled at a constant value (such as 50, 100, 150, 200, 300 kPa), and the maximum radial pressure value can reach 400 kPa. The pressure block 5-5 is equipped with a pressure sensor, and the radial pressure value can be displayed in real-time;

f. The shear pressure t is applied: As shown in FIG. 2, the cylinder 1-6 pushes the reaction plate 1-7 to work, the cutting power system 2, the rotation system 3, the upper cutterhead control system 4, the shear test system 5, and the lower cutterhead control system 6 in FIG. 1 are prompted to push down as a whole, providing downward shear pressure for the upper cutterhead 5-2 in FIG. 7, corresponding to the deep loading shear pressure t of the geological model A in FIG. 9 (at this time, the radial pressure is maintained to a constant value); the cutting tool 5-2 is equipped with a pressure sensor. The shear rate can be controlled at 0.02 mm/min, 0.8 mm/min, etc, the maximum shear pressure value is 400 kPa, and it can be displayed in real-time.

g. The shear process can display and save the real-time curve of shear pressure and shear displacement, when the shear displacement reaches 42 mm, the in-situ shear test in the hole is completed;

h. in order to realize the multi-point in-situ shear test in the hole, the wire rope can be adjusted to be suspended to different depths such as point B and point C at the predetermined depth in hole 7 (as shown in FIG. 9), and the multi-point in-situ shear test can be realized, the operation process is shown in steps c, d, e, f and g.

Therefore, the invention adopts an in-situ test device for holes in rock-soil mass with the above structure, which solves the problems of difficulty in in-situ shear test in the hole of deep rock-soil mass, lack of test device, difficulty in radial test, difficulty in loading while shearing, and difficulty in multi-point in-situ test.

Finally, it should be explained that the above embodiments are only used to explain the technical solution of the invention rather than restrict it. Although the invention is described in detail with reference to the better embodiment, the ordinary technical personnel in this field should understand that they can still modify or replace the technical solution of the invention, and these modifications or equivalent substitutions cannot make the modified technical solution out of the spirit and scope of the technical solution of the invention.

What is claimed is:

1. An in-situ shear test device for holes in rock-soil mass, comprising an axial loading system, a cutting power system, a rotation system, an upper cutterhead control system, a shear test system, and a lower cutterhead control system;

the axial loading system includes a lower pressure cylinder, a cover plate is arranged above the lower pressure cylinder, and a reaction plate is arranged below the lower pressure cylinder;

the cutting power system includes a main cutting motor, the main cutting motor is connected to a lower bottom plate through a bolt;

the rotating system includes a first shaft reducer, the first shaft reducer is connected to a drill pipe through a coupling, a lower part of the drill pipe is provided with a second shaft reducer, and an outer part of the second shaft reducer is provided with a first lifting nut;

the upper cutterhead control system includes a first solenoid valve controller, the first solenoid valve controller is connected to a first lower protective cover through the bolt, and an upper surface of the first lower protective cover is provided with a first drive motor, outer parts of the first solenoid valve controller and the first drive motor are covered by a first upper protective cover;

the shear test system includes an upper cutting tool and a lower cutting tool, the upper cutting tool is connected to an upper cutterhead through a blade shaft, and the lower cutting tool is connected to a lower cutterhead through the blade shaft, a pressure block is arranged between the upper cutterhead and the lower cutterhead, and a scissor-type telescopic structure is arranged inside the pressure block, the scissor-type telescopic structure is connected to the pressure block through a shaft;

the lower cutterhead control system includes a second solenoid valve controller, an upper surface of the second solenoid valve controller is provided with the bolts, a side of the second solenoid valve controller is provided with a fixed bracket, the second solenoid valve controller is connected to a second upper protective cover through the bolt and the fixed bracket, the second upper protective cover is provided with a second drive motor, and a second lower protective cover is provided below the second upper protective cover;

pressure sensors are arranged on the upper cutting tool, the lower cutting tool, and the pressure block.

2. The in-situ shear test device according to claim 1, wherein a positioning flange is arranged on an upper surface of the cover plate, a limit column with limit and unloading rebound effect is arranged between the cover plate and the reaction plate, and a position limit screw and a spring are arranged inside the limit column; an outer part of the lower pressure cylinder is provided with a connecting plate, and the lower pressure cylinder is connected to the cover plate through the connecting plate.

3. The in-situ shear test device according to claim 1, wherein the main cutting motor is surrounded by support rods, and two ends of each of the support rods are connected to the reaction plate and a lower bottom plate respectively.

4. The in-situ shear test device according to claim 1, wherein the first shaft reducer and the coupling are covered by a circuit slip ring, and a bottom end of the drill pipe is provided with a bearing.

5. The in-situ shear test device according to claim 1, wherein a center of the first upper protective cover is provided with a first upper protective cover reserved hole, and a center of the first lower protective cover is provided with a first lower protective cover reserved hole.

6. The in-situ shear test device according to claim 5, wherein a center of the upper cutterhead is provided with an upper reserved hole, and an outer part of the upper reserved hole is provided with a first cutting gear, an outer part of the first cutting gear is provided with a first tool gear, and the first cutting gear is connected to the upper cutting tool through the first tool gear, a center of the lower cutterhead is set with a lower reserved hole, an outer surface of the lower reserved hole is set with a second cutting gear, the outer surface of the second cutting gear is set with a second tool gear, and the second cutting gear is connected to the lower cutting tool through the second tool gear.

7. The in-situ shear test device according to claim 6, wherein a top and a bottom of the scissor-type telescopic structure are provided with a second lifting nut, and the second lifting nut is connected to the first lifting nut.

8. The in-situ shear test device according to claim 6, wherein a center of the second upper protective cover is provided with a second upper protective cover reserved hole, and a center of the second lower protective cover is provided with a second lower protective cover reserved hole.

9. The in-situ shear test device according to claim 8, wherein the drill pipe passes through the first upper protective cover reserved hole, the first lower protective cover reserved hole, the upper reserved hole, the lower reserved hole and the second upper protective cover reserved hole, and the drill pipe is connected to the second lower protective cover reserved hole through a bearing.

10. The in-situ shear test device according to claim 7, wherein two ends of the second shaft reducer are connected to the upper reserved hole and the lower reserved hole respectively through the first lifting nut and the second lifting nut.

\* \* \* \* \*